Nov. 28, 1950 H. L. SAXTON 2,531,474

PHASE SHIFTING CIRCUIT

Filed May 21, 1946

Inventor
HAROLD L. SAXTON

By M. O. Hayes

Attorney

Patented Nov. 28, 1950

2,531,474

UNITED STATES PATENT OFFICE 2,531,474

PHASE SHIFTING CIRCUIT

Harold L. Saxton, Washington, D. C.

Application May 21, 1946, Serial No. 671,342

3 Claims. (Cl. 323—119)

(Granted under the act of March 3, 1883, as amended April 30, 1928; 370 O. G. 757)

This invention relates to phase shifters and more particularly to electronic phase shifters.

In many types of radio, radar, and other electronic equipment it is desirable to controllably shift the phase of alternating voltages in many recognized applications such as for standards of comparison in measuring circuits. Existing phase shifting circuits present a number of features which have proved objectionable in many applications. The conventional split transformer circuit would in some cases require a floating power-supply or no ground connection on any of the transformer leads. In addition, most phase shifters will reflect a varying impedance to the associated circuits as a result of variation of the frequency or amplitude of the applied voltage, or will produce an output whose ampltiude varies with the input frequency.

It is therefore an object of this invention to provide an electronic phase shifting circuit which will not affect its associated circuits under conditions of a varying frequency or amplitude signal voltage.

It is another object of this invention to provide an electronic phase shifting circuit which will faithfully reproduce the amplitude and frequency of the signal voltage.

It is another object of this invention to provide an electronic phase shifting circuit having a vacuum tube input which divides the signal voltage into components of opposite phase relation.

It is another object of this invention to provide an electronic phase shifting circuit having an impedance control tube by which the amount of phase shift can be electronically controlled.

Other objects and advantages of the invention will be apparent from the following description and accompanying drawing.

Briefly, the voltage to be shifted in phase is applied to a control grid of a vacuum tube having both plate and cathode loading resistors. The variation in plate current caused by a voltage on the control grid will produce voltage components across each of said resistors 180° out of phase with each other and proportional in amplitude to the applied voltage. A resistance reactance network is connected across one of said voltage components shifting it in phase, said component being then vectorially summed with the other voltage component to produce an output shifted in phase from the input. In the single embodiment of the invention herein illustrated, one of the components comprising the phase shifting network is a vacuum tube impedance preferably a reactance tube; it being understood, however, that such element could be replaced with a physical impedance having similar characteristics. A reactance tube, or alternately, a resistance tube, is preferred to a physical impedance since it provides for control of the phase shift in response to a control signal rather than by mechanical variation of a physical impedance.

Figure 1:
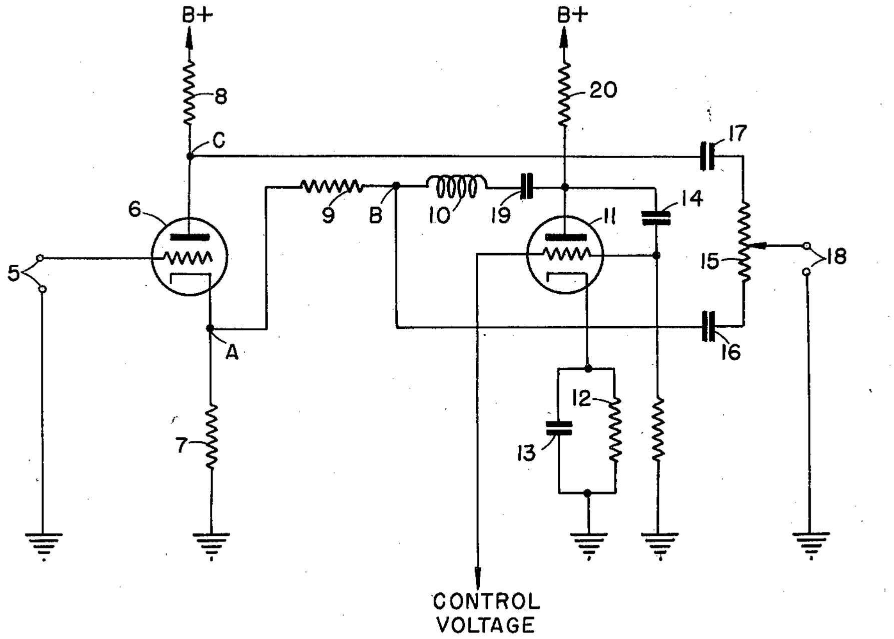
Fig. 1 is a schematic diagram of one embodiment of this invention.

Referring now to the drawing, Fig. 1 shows a schematic diagram of a phase shifting circuit in which the voltage to be shifted in phase may be applied directly to the grid of a triode type vacuum tube 6 and ground, as through the input terminals indicated at 5. The cathode of said tube 6 is tied to ground through a resistance 7 large enough to avoid loading the circuit associated with the input terminals 5. The plate of said tube 6 is tied to B+ through a resistor 8 approximately half as large as said cathode resistor 7. Thus an input voltage producing for example, a positive rise in the grid voltage of said tube will increase the plate current through said resistors 7 and 8 to produce a rise in voltage at the cathode of said tube (point A) and a drop in the voltage at the plate (point C). These voltage changes will be proportional to the input voltage and the cathode voltage change will be approximately twice that at the plate due to the ratio of the resistances 7 and 8. Connected across the output at the cathode resistor 7 of the voltage dividing stage, is the phase shifting network, comprising resistor 9, fixed inductance 10 and reactance tube 11 connected in series. It will be noted that said series circuit also includes a condenser 19, however this condenser 19 has negligible reactance at signal frequencies and serves only to block the plate supply voltage of the reactance tube 11 from the cathode of the voltage dividing stage 6. Incidental to said reactance tube 11 is a cathode biasing means consisting of a cathode resistor 12 shunted by a cathode by-pass condenser 13. The resistor 9 connects the cathode of the first tube 6 to the fixed inductance 10 and where it joins said inductance is designated point B in the drawing. At said point B the voltage component produced at the cathode (point A) is shifted in phase to an extent controlled by the character of the reactive elements 10 and 11. As here shown the inductance 10 will supply a fixed inductive reactance which by itself would produce a current lag in respect to voltage. This inductive reactance is vectorially added by series connection to the reactance of the vacuum tube 11. Said tube 11 is connected so as to act as a capacitance, by virtue of a capacitor 14 tied between the grid and plate of said tube 11, said grid being fed with a phase lead ahead of the plate so that the plate current, which is controlled mostly by the grid voltage, leads the plate voltage. The capacitive reactance of the reactance tube 11 may be varied by changing the bias on its grid. As will be seen below, this variable characteristic provides a means of varying the degree of phase shift.

Figure 2:
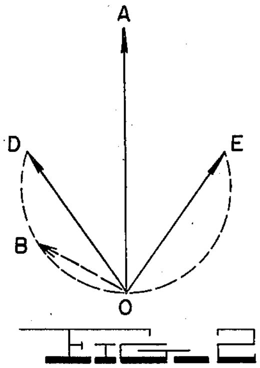
Fig. 2 is a vector diagram explaining some of the voltage relations in Fig. 1.

When the capacitive reactance of the tube 11 is less than the inductive reactance of the inductance 10, this series circuit will draw a lagging current. The voltage across the reactances from point B to ground then leads that across the cathode resistor 7. As the inductive reactance approaches in magnitude the capacitive reactance, the phase lead of the voltage signal from point B to ground with respect to that across the cathode resistor 7 approaches 90° and the voltage drop across the reactances approaches zero. Then as the capacitive reactance becomes greater than the inductive reactance, the phase of the voltage across the reactances becomes a lag and the voltage drop increases. This is shown by the vector diagram in Fig. 2, to which reference is now made. The vector OA represents the voltage between point A and ground in Fig. 1, and vector OB represents the voltage between point B and ground. The vector OB describes an arc coinciding with O at the middle of said arc, the different vector values of OB being thus obtained from different comparative values of the capacitive reactance and the inductive reactance. OB varies from OD to OE as the capacitive reactance is increased from minimum to maximum, the terminus B tracing out the circular locus DBE.

Figure 3:
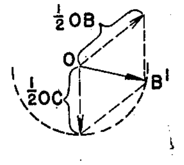
Fig. 3 is a vector diagram demonstrating the voltage output from Fig. 1.

In order to produce a phase shifted output voltage having a circular locus with its center at ground, a component of the voltage developed across the plate resistor 8 and equal in magnitude to one-fourth the voltage developed across the cathode resistor 7 is added to half the magnitude of the phase shifting voltage developed across the reactance circuit by summation means hereinafter described. The output of the phase shifting circuit is taken from said summation means and is shown in Fig. 3 as the resultant vector OB′. In this illustration the vector represented as ½ OC is the component derived from the plate circuit of tube 6 and the vector ½ OB is that component derived from across the reactances 10 and 11. It is seen that OB′ is a vector of constant magnitude but with a phase variable over approximately 270°.

Referring again to Fig. 1, a high resistance 15 is connected by a capacitor 16 to point B in the series circuit paralleling the cathode resistor 7, by said connection the voltage OB across the inductance 10 and the reactance tube 11 is fed to the high resistance 15. The other end of said high resistance 15 is connected by a capacitor 17 to point C which is the plate side of the voltage dividing tube 6. This latter connection feeds to said high resistance the voltage dropped by said tube's plate loading resistor 8. Said voltage will have a magnitude one-half that of the voltage across the cathode resistor 7 since the former resistor has a resistance only one-half that of the latter resistor. And said voltage will be in phase opposition to the cathode voltage by virtue of the phase reversing properties of vacuum tubes. Then by taking the output 18 from the center tap of said high resistance, a voltage divider action is produced and the compounds of said output voltage will consist of one voltage having the phase of voltage OB but only half its magnitude and another voltage component having a phase opposite to OA and one fourth its magnitude, thus providing the voltage vectors, ½ OB and ½ OC respectively whose summation is OB′ as shown in Fig. 3.

It should be further noted that interchanging the plate and cathode resistors of the voltage dividing tube 6 will permit interchanging the output connections, points A and B, of said tube 6; said interchange of resistors and connections will provide a plate supply path to the reactance tube 11 from the voltage dividing tube 6, and the blocking condenser 19 and plate resistor 20 may be eliminated.

Although I have shown and described only a limited and specific embodiment of this invention, it is to be understood that I am fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. Apparatus for varying the phase without varying the amplitude of an alternating signal voltage comprising, phase inverting means converting the signal voltage to a pair of out of phase output voltages one of which has an amplitude larger than the other, a phase-shifting circuit connected to receive the large inverter output voltage, a center-tapped high resistance means, circuit means connecting opposite ends of said resistance means to receive respectively the smaller inverter output voltage and the phase shifting circuit output voltage, said center tap being the variable phase constant amplitude output terminal.

2. Apparatus for varying the phase without varying the amplitude of an alternating signal voltage comprising, phase inverting means converting the signal voltage to a pair of out of phase output voltages one of which has a larger amplitude than the other, a phase shifting circuit connected to receive the larger inverter output voltage, said phase shifting circuit including a fixed and a variable reactance, said variable reactance being operative to vary the phase shift in said circuit in response to a control signal, a center-tapped high resistance means, circuit means connecting opposite ends of said resistance means to receive respectively the smaller inverter output voltage and the phase shifting circuit output voltage, said center tap being the variable phase constant amplitude output terminal.

3. Apparatus for varying the phase without varying the amplitude of an alternating signal voltage comprising, a phase inverting means converting the signal voltage to a pair of out of phase output voltages one of which has a larger amplitude than the other, a phase shifting circuit connected to receive the larger inverter output voltage, said phase shifting circuit including a vacuum tube connected as a reactance tube operative to vary the phase shift in said circuit in response to a control signal, a center tapped high resistance means, circuit means connecting opposite ends of said resistance means to receive respectively the smaller inverter output voltage and the phase shifting circuit output voltage, said center tap being the variable phase constant amplitude output terminal.

HAROLD L. SAXTON.

REFERENCES CITED

The following references are of record in the file of this patent:

UNITED STATES PATENTS

| Number | Name | Date |
|---|---|---|
| 1,900,538 | Bedford | Mar. 7, 1933 |
| 2,220,118 | Overbeck | Nov. 5, 1940 |
| 2,376,392 | Shepherd | May 22, 1945 |
| 2,422,424 | Landon | June 17, 1947 |